(12) United States Patent
Schrive et al.

(10) Patent No.: US 6,331,253 B1
(45) Date of Patent: Dec. 18, 2001

(54) METHOD AND PLANT FOR TANGENTIAL FILTRATION OF A VISCOUS LIQUID

(75) Inventors: Luc Schrive, Pont Saint Esprit; Stéphane Sarrade, Noutpellier; Christian Perre, Pierrelatte, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/402,299
(22) PCT Filed: Apr. 14, 1998
(86) PCT No.: PCT/FR98/00746
§ 371 Date: Oct. 20, 1999
§ 102(e) Date: Oct. 20, 1999
(87) PCT Pub. No.: WO98/46337
PCT Pub. Date: Oct. 22, 1998

(30) Foreign Application Priority Data

Apr. 15, 1997 (FR) .................................................. 97 04619

(51) Int. Cl.[7] .................................................. B01D 61/00
(52) U.S. Cl. .................... 210/652; 210/650; 210/651; 426/425
(58) Field of Search .................... 210/650, 651, 210/634, 653, 805, 652; 426/425

(56) References Cited

U.S. PATENT DOCUMENTS

| 5,160,044 | * | 11/1992 | Tan . |
| 5,204,003 | * | 4/1993 | Cochran, Jr. . |
| 5,527,466 | * | 6/1996 | Le et al. . |
| 5,707,673 | * | 1/1998 | Prevost et al. . |
| 5,961,835 | * | 10/1999 | Sarrade et al. . |
| 6,113,795 | * | 10/1999 | Subramaniam et al. . |

FOREIGN PATENT DOCUMENTS

| 35 39 432 A1 | 6/1986 | (DE) . |
| 0041013 | 12/1981 | (EP) . |
| 356 815 A2 | 3/1990 | (EP) . |
| 2 453 211 | 10/1980 | (FR) . |
| 2 598 717 | 11/1987 | (FR) . |
| 2 705 031 | 11/1994 | (FR) . |

* cited by examiner

*Primary Examiner*—Ana Fortuna
(74) *Attorney, Agent, or Firm*—Pearne & Gordon LLP

(57) ABSTRACT

The invention relates to a method of tangential filtration of a viscous fluid or liquid in which a supercritical substance is dissolved in a supercritical state in this viscous fluid or liquid so as to lower the viscosity. The invention also relates to the installation for the implementation of the method. The invention is applicable particularly to the filtration of heat sensitive organic liquids and used motor oils.

26 Claims, 5 Drawing Sheets

1

METHOD AND PLANT FOR TANGENTIAL FILTRATION OF A VISCOUS LIQUID

This application is a 371 of PCT/FR98/00746, filed on Apr. 14, 1998, which is based on application FR/970619, filed on Apr. 15, 1997.

DESCRIPTION

The invention relates to a method of tangential filtration of a viscous fluid or liquid in which a third substance is dissolved in a supercritical state in this viscous fluid or liquid so as to lower the viscosity.

The invention also relates to the installation for the implementation of the method.

The invention is applicable particularly to the filtration of heat sensitive organic liquids and used motor oils.

The technological field of the invention is the filtration, more precisely the filtration of viscous fluids or liquids, and in particular the tangential filtration of these viscous fluids or liquids.

Filtration in the traditional sense of the word is head-on filtration in which a flow of liquid meets a porous obstacle perpendicular to its path which retains all the particles greater than the size of the pores. The retained particles, the size of which is traditionally of the order of from a millimeter to a micrometer, then form a cake which, in its turn contributes to the performance of the filtration. The particles which are retained are smaller and smaller while the flow of filtrate reduces, this being the phenomenon of clogging up. The filtration conditions never reach a quasi-stationary state.

In tangential filtration, these disadvantages are done away with, since the fluid is carried in a dynamic fashion and the main flow of liquid runs parallel to the filtering surface which prevents it clogging up.

Because of this and provided that the operating conditions are well chosen, the performance of the filtration in relation to retention and to flow can be considered to be constant over a sufficiently large period of time, in other words the conditions are quasi-stationary.

In the case of viscous fluids, this filtration is hindered by the rheological properties of these compounds.

In effect, the friction forces induced by the flow of a fluid through a porous body are very high in conformity with POISEUILLE's Law since the flow rate of an uncompressible liquid is in inverse proportion to the viscosity.

In tangential filtration, where the fluid, as has been seen above, is carried in a dynamic fashion in order to avoid clogging up the filtering surface, this disadvantage is even more important since the viscous drag through the porous body is added to the frictional forces due to the turbulent flow in the piping.

This is one of the reasons why the traditional methods of tangential filtration, such as, for example micro-filtration, ultra-filtration or nano-filtration essentially relate to aqueous liquids, the viscosity of which is close to that of pure water, namely 1 mPa·s at 20° C.

With regard to organic liquids, their viscosity, when they are not pure solvents, can be very high, which makes their filtration impossible. This is notably the case for mineral oils that arise from petroleum fractions or vegetable or animal oils.

Hence various solutions have been proposed in the literature so as to optimize or simply to make the filtration of viscous fluids possible, in particular by tangential filtration.

The first solution consists of increasing the temperature of the fluid or liquid to be filtered so as to lower the viscosity.

Hence the document EP-A-0 041 013 describes a method known under the name of the REGELUB® method, in which used motor oils are treated, with a view to recycling them, at a temperature of from 250 to 300° C. to lower their kinematic viscosity from 150 cSt to 1 to 2 cSt. The used oils, previously decanted to remove the water and distilled to remove the diesel oil or gasoline, are then filtered on ceramic mineral membranes made of $\alpha$ alumina or on carbon based membranes, meaning that two batches are obtained: a first batch representing 10% of the initial volume where the contaminants are concentrated by a factor of 10, and a second purified batch, representing 90% of the initial volume, of commercial quality that simply requires a discoloration and an adjustment of the concentration of the additives.

The contaminants are essentially solid particles in the form of sediments, sulfur containing compounds, metals stemming from wear in the engines such as iron, lead stemming from the fuel etc., as well as calcium, magnesium, phosphorus etc.

The essential disadvantages of this method are:

- the very high operating temperature which necessitates precautions because of the dangers of the inflammability of the treated product; and
- the mechanical stresses applied to the ceramic membranes. These stresses stem from the differential expansions between materials, caused by the heat during the start-up and the shut-down of the equipment.

At the present time and for techno-economic reasons, the industry prefers the sulfuric acid process to this method, despite its negative environmental impact, notably due to the large amount of solid waste in the form of sludges.

More generally, the solution that consists of heating the liquids to be filtered in order to reduce their viscosity cannot be used for heat sensitive products which would be degraded by the heating, and, on the other hand, it is restricted by the technology of "standard range" equipment. Because of this, temperatures of from 120 to 150° C. are not exceeded, which only causes a limited decrease in the viscosity.

A second solution that allows the filtration of viscous fluids consists of adding at atmospheric pressure, a low viscosity solvent or "third substance", soluble in the product to be filtered, in order to lower the viscosity.

For example, as described in the document FR-A-2 453 211, hexane can be added to a motor oil.

In this way, the viscosity of the used oil will be reduced by a factor of 2 to 3 which allows a real improvement in tangential filtration equal to the ratio of the viscosities divided by the volumes of each of the constituents. Therefore it is necessary for the viscosity to be strongly reduced on adding small quantities of a third substance. Put another way, there is interest in adding a third substance of the lowest possible viscosity.

The main disadvantage of such a method is to have to separate the two miscible phases in an extra process step. For example, distillation would be used to separate hexane from the oil phase. In addition to it representing an additional step, this operation is costly in energy which makes the method rather uncompetitive.

A third solution which makes the tangential filtration of viscous liquids possible consists of increasing the parietal stress by the filtration of a two phase, gas/liquid mixture.

In this case, the working pressure is of the same order as for traditional ultra-filtration since it reaches a maximum of 5 to 6 bars. This can qualify as atmospheric filtration since the permeate is at atmospheric pressure.

The gas is not dissolved in the liquid phase but is injected in co-current with the liquid, generally vertically. Because of the difference in the density of the two phases, the bubbles of gas will have an ascending speed greater than that of the liquid flow. They will create a "blockage" and the steric volume it occupies will destabilize the polarization layer by lamination. In absolute terms, the velocity gradient will become very high locally, causing a significant increase in the flow of the permeate. This method, on a laboratory scale, has also been described in the document by M. MERCIER and C. DELORME—"Influence d'un écoulement diphasique gaz/liquide sur les performances de la filtration tangential"—Colloque Université Industrie—Toulouse 13.06.96, and is only applicable when the product to be filtered does not foam.

A third method, which consists of using a "third substance" under pressure to treat hydrocarbons is described, for example, in the document FR-A-2 598 717 in which hydrocarbon oils are treated with a solvent to remove bituminous materials and to form a light oily phase and a heavy bituminous phase. The solvent is recovered from the oily phase by subjecting it to super-critical conditions for the solvent so as to form a new light phase enriched in solvent and a new heavy phase. This new light phase, very low in viscosity, is subjected to tangential filtration on a porous mineral membrane.

This method is getting close to being a liquid/liquid extraction, since the component in the liquid or super-critical state constitutes a separate phase, the action of which is to extract the light extractable components and/or, in parallel to this, cause a separation and a precipitation of the heavy components.

Furthermore, it is not the heavy, viscous, liquid phase that is being treated by tangential filtration but the light phase which is a solution having a very low viscosity, of the order of that of pure organic solvents in the liquid or super-critical state, being between 0.1 and 1 mPa·s.

Finally, the purpose of the filtration in this method is not to fractionate components of different sizes dispersed in a solvent, but rather to recover the pure solvent with a view to recycling it.

In addition, it is known that, in the absence of gas, viscosity increases with pressure. This is particularly the case with compressible polymers, such as silicone oils.

On the other hand, if the polymer is in contact with a gas, the pressure will dissolve the gas in the liquid phase. In this case, as studied by M. Daneshvar, S. Kim and E. Gulari in the document "High Pressure Phase Equilibria of Polyethylene Glycols/Carbon Dioxide Systems" J. Phys. Chem. 94 (5) p.2124–2128, 1990, the solubility, for example of carbon dioxide, reduces with temperature and increases with pressure while the viscosity reduces with the quantity of dissolved gas.

This principle has been exploited, but only for the head-on filtration of extremely viscous products such as plastics in the molten state, as described in document JP-A-87 206 471.

Similarly, document EP-A-0356 815 relates to the treatment of polycarbonates, polyester carbonates and aromatic polyesters which are melted and then treated with a super-critical gas so as to reduce the viscosity, which makes their purification possible by head-on filtration on fine filters, for example, on stainless steel filtration candles. The initial viscosities of the molten polymers are very high, for example, of the order of 900 Pa·s and are brought down to final viscosities of about 35 Pa·s by treatment with carbon dioxide gas at 250 bars and 257° C.

Such viscosities would certainly not permit tangential filtration of these fluids. In effect, as has already been mentioned, in tangential filtration, there is the absolute requirement to control a continuous process, notably by tangentially transporting a flow of permeate to the filtering layer. Because of this, it is essential that the liquids must be less viscous, with a maximum viscosity of the order of 1 Pa·s.

It emerges from the work which has gone before that until now there has not been a tangential filtration method that allows viscous fluids or liquids to be treated in a satisfactory manner.

Therefore, there exists a need for a filtration method that has all the advantages of tangential filtration and permits the filtration of viscous fluids and liquids, in particular liquids which are sensitive to heat.

That is to say, there exists a need for a method for the tangential filtration of viscous fluids or liquids that operates preferably at moderate temperatures.

The objective of this invention is to provide a method for the filtration of a viscous fluid or liquid which does not have the disadvantages of the prior art and which enables the problems met with in these methods to be overcome.

The objective of this invention is also to provide a method for the filtration of a viscous liquid which responds among other things to the requirements mentioned above.

This objective and others have been achieved, conforming to the invention, by a method for the filtration of a viscous fluid or liquid having heavy and light components, and having an initial viscosity, under ordinary conditions of from 0.01 Pa·s to 1 Pa·s, characterized in that, under the effect of pressure, a third substance in the super-critical state is dissolved in the viscous liquid, this third substance having a viscosity very much less than that of said viscous liquid, meaning that a single phase liquid solution is obtained whose viscosity is reduced in comparison with the initial viscosity of the pure viscous liquid, said single phase liquid solution being treated under pressure by tangential filtration, to give, on the one hand a retained material comprising the third substance and the heavy component and on the other hand a permeate comprising the third substance and the light components.

In addition, it should be made clear that:

the heavy components without the third substance form the residue the light components without the third substance form the filtrate generally, part of the retained material is separated (diverted) and discharged, generally on a continuous basis, this part being called the "concentrate". Another part of the retained material, which keeps the name "retained material" is generally returned to the start of the method downstream from the filtration.

The method according to the invention, due to the lowering of the viscosity obtained by dissolution of the third substance in the viscous fluid and, in general, without a large increase in temperature, permits tangential filtration of all types of viscous fluids and liquids.

The viscous fluids and liquids treated by the method according to the invention generally have an initial viscosity, under ordinary conditions, (that is to say, atmospheric pressure and 25° C.) of $10^{-2}$ Pa·s to 1 Pa·s.

The viscous liquid generally referred to as the initial liquid or "first substance", contains, for example, the particles and/or molecules to be separated, that is to say the "second substance".

The field of application of the method according to the invention is therefore in the range of medium to high viscosities, as opposed to the very high viscosities met with in methods such as that described in document EP-A-0 356 815.

According to the invention, the third substance can be chosen from among compounds that are gaseous under ordinary conditions of temperature and pressure (1 bar, 25° C.) and are non-reactive to the initial viscous liquid.

The third substance can also be chosen from among compounds which are liquid under ordinary conditions of temperature and pressure and are non-reactive to the initial viscous liquid.

In the case where the third substance is a liquid, the operating conditions for the method must lead to it being in the super-critical state, in which it is of very low viscosity.

According to the invention, the viscosity of the third substance must preferably be very much lower than that of the viscous liquid, that is to say it must preferably be from $10^{-5}$ to $10^{-3}$ Pa·s, that is to say from 100 times to 100 000 times lower than that of the viscous liquid.

The third substance is generally a pure compound but it can also be formed from a mixture of two or more pure components, each having third substance properties.

The single phase liquid solution (also called the "liquid phase") obtained, also has a reduced viscosity which is generally of the order of about a tenth to about a hundredth of the initial viscosity of the viscous liquid. Therefore the viscosity of the single phase solution will generally be $10^{-3}$ Pa·s. This reduction of the viscosity, due to the dissolution of the third substance leads to a very great improvement in the permeability for the filtrate compared with filtration without a third substance at the same temperature.

The method according to the invention, operates advantageously at moderate filtration temperatures, for example from 20 to 200° C., preferably from 40 to 150° C., more preferably from 40 to 80° C.

Hence, in the case of heat sensitive products, the temperature of the method can be held within limits compatible with the absence of chemical degradation. Such temperatures are significantly less than the temperatures in the methods of the prior art. The operating conditions for the method according to the invention are therefore harmless for all viscous organic liquids, even the most heat sensitive. The method according to the invention, for the first time permits tangential filtration of heat sensitive liquids and fluids which until now it had been impossible to filter by traditional tangential filtration, that is to say filtration at atmospheric pressure. In the same way, the limited temperature allows inflammable liquids to be filtered under better conditions of safety, without having recourse to complicated and expensive equipment.

The range of moderate temperatures that are advantageously used by the method do not impose great restrictions on equipment and is compatible with installations constructed using the usual materials without it being necessary to have recourse to special and costly materials.

The method according to the invention, due in particular to the low viscosity of the liquid phase obtained by dissolution of the third substance, the moderate temperature used and the reduced circulation speed used enables a significant improvement to be made in the energy efficiency of the method compared with the methods of the prior art.

By way of example, the speeds of circulation in the method of the invention are from 0.5 to 10 m/s, preferably from 1 to 5 m/s and more preferably from 1 to 4 m/s. These speeds are relatively lower compared with the methods of the prior art.

The pressures used in the method of the invention are, in all cases greater than the usual pressures for tangential filtration methods such as the atmospheric micro-filtration or ultra-filtration methods.

The working pressure obviously depends on the viscous fluid and on the third substance used. It will generally be from 30 to 500 bars, preferably from 50 to 300 bars and more preferably from 100 to 500 bars. For each viscous fluid, there exists an optimum pressure which only permits the dissolution of the quantity necessary for the lowering of the viscosity without at the same time diluting the liquid phase too much.

It should be noted that the temperature and pressure conditions can be chosen to be sub-critical in relation to the third substance, or preferably super-critical in relation to the third substance.

Pressurization in the method can be provided by the pressure of the third substance present in excess in the gaseous or super-critical state which is supernatant above the liquid phase.

However the pressurization can also be provided by a neutral gas such as helium, or by a gas having the characteristics of a neutral gas such as nitrogen, the partial pressure of which in the liquid phase can be neglected. It is desirable to operate in that way when the density difference between the third substance and the liquid phase becomes too little, for example at 400 kg/m$^3$, since, in this case, the circulation of the liquid phase can lead to an uncontrolled two phase mixture in the separation device such as a membrane.

The tangential filtration is applicable to the separation of any particles or molecules contained in the initial viscous liquid or fluid, whatever their size, and it can therefore be used for micro-filtration, ultra-filtration or nano-filtration.

The pressure used during the operation of tangential filtration or transmembrane pressure depends on the technology used. It will generally be from 1 to 6 bars for micro-filtration or ultra-filtration and from 5 to 50 bars for nano-filtration.

According to the invention, the permeate—that is to say the fraction of the liquid phase which passes through the filtration device such as a membrane, and which is formed by the single phase mixture of the viscous liquid plus the third substance from which the "heavy" molecular components and/or particles retained by the membrane are missing and in which the "light" compounds are to be found—and the separated (diverted) concentrate from the retained material—the retained material being the fraction of the liquid phase which is retained by the filtration device such as a membrane, and which is formed by the single phase mixture of the viscous liquid plus the third substance in which the "heavy" components retained by the membrane—are advantageously treated by reducing the pressure (depressurization) meaning that the permeate is separated into a filtrate comprising "light" components and the third substance and the concentrate is separated into a residue including "heavy" compounds and the third substance.

By lowering the pressure, it is understood that the pressure that in general was from 30 to 500 bars at the start is in general reduced to between 1 and 5 bars.

Advantageously, according to the invention, the depressurization of the permeate and/or the concentrate can be carried out in several steps, for example, from 2 to 4 steps, each operating at pressures for example from 500 to 300 bars, then from 150 to 50 bars, then from 50 to 1 bar, depending on whether one wishes to recover fractions that are more or less rich in the lighter components. These will be found in the main in the later steps of the depressurization.

The third substance arising from the separation of the permeate and/or that from the concentrate is recycled to the start of the method which contributes favorably to the mass and energy balance sheet for the method.

Preferably, in order to permit this recycling, the pressure at the end of the depressurization must be equal to the pressure at which the third substance is supplied.

The method, prior to the tangential filtration can advantageously include an additional decantation/separation step. In effect the initial bringing into contact of the viscous liquid and the third substance can lead to separation of heavy components which are soluble in the pure viscous liquid but insoluble in the liquid phase. This phenomenon is known under the name of the "anti-solvent effect". The interest of such a preliminary supplementary step is to anticipate the separation in relation to a single tangential filtration step and to allow an increase in the flow of the permeate. The separation of the heavy components which are difficult to separate, is obtained very easily by a simple addition of a third substance thanks to this advantageous step of the method according to the invention.

Finally, the method according to the invention can be implemented in a continuous manner or in a non-continuous manner, in other words batch-wise. In this latter case, the viscous liquid and the third substance must be supplied in one go, before the tangential filtration stage. This is of particular interest for products with high added value, available in small quantities and for which continuous operation is not suitable.

Among the compounds gaseous at ordinary temperatures, that are suitable as third substances, one could mention by way of example: carbon dioxide, helium, nitrogen, nitrogen monoxide, sulfur hexafluoride, gaseous alkanes with from 1 to 5 carbon atoms: methane, ethane, propane, n-butane, pentane, neo-pentane, gaseous alkenes having from 2 to 4 carbon atoms: ethylene, propylene, butene; gaseous alkynes: acetylene, propyne and butyne-1; gaseous dienes such as propadiene; gaseous fluorinated hydrocarbons, gaseous chlorinated and/or fluorinated hydrocarbons, for example the chlorofluorocarbons called "Freon®" and others known as CFCs or HCFCs etc.

Among the compounds liquid at ordinary temperatures that are suitable as third substances, one could mention by way of example: alkanes from 5 to 20 C., such as n-pentane, iso-pentane, hexane, heptane, octane, liquid alkenes with from 5 to 20 C. atoms, liquid alkynes with from 4 to 20 C. atoms, alcohols such as methanol, ethanol, ketones such as acetone, ethers, esters, liquid chlorinated and/or fluorinated hydrocarbons etc.

Usually the third substance is in excess with respect to the liquid phase, that is to say it is present at a quantity of from 1 to 10 times the quantity of liquid phase.

In this case, the thermodynamic equilibrium is considered to be achieved and the viscosity is a minimum.

However it is also possible to dissolve a quantity of the third substance that is less than the maximum solubility under the operating conditions aimed for: this quantity being for example from 0.1 to 1.0 times the quantity of liquid phase. Since the amount dissolved is not the maximum, the viscosity obtained will be greater than the equilibrium viscosity, but in the case where one wishes to avoid any risk of separation of heavy components, the "anti-solvent" effect is reduced in this way.

The viscous fluids or liquids which can be treated by the method of the invention are, for example, organic or aqueous fluids or liquids, in particular organic, heat sensitive fluids or liquids containing heat sensitive products such as vegetable oils or animal oils, body fluids, various food products, liquids arising from agriculture, and aqueous phases containing proteins. Among the vegetable oils, one could mention for example, olive oil, sunflower oil, oregano oil, argan oil.

Among the animal oils, one could mention for example the fish oils such as poor cod oil, sardine oil and cod liver oil.

The viscous fluid or liquid can also be chosen from among the mineral oils, for example, those arising from petroleum fractions, silicone oils, industrial oils or fluids, motor oils, cutting oils, wire drawing oils, petroleum oils such as the residues from the distillation of raw petroleum, used oils from all sources such as used motor oils, used industrial oils etc., liquids or fluids from industrial processes loaded with particles and/or heavy components, for example catalyst particles, molten polymers such as polyethylene glycols (PEGs) etc.

Hence the method of the invention may be applied to the regeneration of used oils with a view to their regeneration and their recycling.

Today, the major part of recyclable used oils are the black oils, made up in part by industrial oils, for example wire drawing oils, or more importantly by motor oils. Their recycling which constitutes close to 60% of the total, or 268 000 tons in 1992 for France, poses problems of residual pollution whether this is by incineration in cement producing plants because of the gaseous discharges or by the sulfuric acid process and to the earth because of the solid wastes in the form of sludges.

The method for the treatment of used oils called the REGELUB® method, described above, has, as we have seen the major disadvantage of having a working temperature that is too high and of the order of 300° C.

The method, according to the invention, enables problems associated with this method to be alleviated while obtaining viscosities of the same order of magnitude, namely between 1 and 3 mPa·s.

The single phase liquid phase obtained by dissolving a third substance such as $CO_2$ and made up of the raw oil and the gas is then treated on membranes made of ceramic with a cut-off threshold compatible with the components to be retained, in general within the range of micro-filtration or of ultra-filtration.

An extra advantage of the method is the separation of tars which are to be found in these oils following the combustion of fuel during operation of the engine. This separation is directly obtained by a simple addition of $CO_2$, causing an anti-solvent effect.

Furthermore, the pollutants generated during operation of the engine, which are notably metals, are concentrated in a residual phase that is easy to treat and that produces waste that is ultimately less than that from the sulfuric acid process.

The filtrate obtained, that usually represents 90% or more of the initial quantity of viscous fluid, has the same characteristics as that obtained through the REGELUB® process.

The method of the invention can also find an application in the petrochemical industry for the removal of asphaltenes and catalyst fines, contained for example in a petroleum fraction.

In effect, it is known that the raw residues obtained after separation of the light fractions generally by distillation, can be used to form products of value by catalytic cracking. The aim of this operation is to hydrogenate and then to "crack" the heavy molecules so as to reduce the molecular mass and to make them more suitable for combustion. This allows them to be used as a fuel in the same way as the initial light fractions.

This operation is usually carried out after dissolution of the residues in a low boiling point solvent. An alkane can be used under pressure, for example, propane as in the ROSE process ("Residuum Oil Supercritical Extraction").

There are two disadvantages associated with the operation of catalytic cracking:

poisoning of the catalyst by metal compounds, even when these are present in trace quantities. They are essentially compounds formed by nickel, molybdenum, vanadium complexed by asphaltenes, the presence of catalyst fines which must be separated from the petroleum fraction and if possible recycled.

In the first case, the use of the method according to the invention allows one to separate the asphaltenes containing the metals. This operation takes place before the catalysis.

In the second case, the method according to the invention allows one to separate the catalyst fines. This operation takes place after the catalytic step.

The method according to the invention applied to the ROSE process or to similar processes is all the more interesting since a third substance in the supercritical state, in this case propane, is already available.

The method according to the invention is applicable in a particularly advantageous manner to the tangential filtration of heat sensitive liquids or fluids or containing heat sensitive products, in particular liquids or fluids of animal, vegetable origin, food products etc.

In this application, the temperature is held within the limits of chemical or biological compatibility of the product.

A particularly preferred application is the treatment, at a temperature, for example of 40° C., of fish oils such as poor cod oil, which one wishes to enrich the triglyceride fraction in C20 and C22 polyunsaturated fatty acids (eicosapentaenoic acid:EPA and docosahexa-enoic acid:DHA). These fatty acids have a beneficial effect for the lowering of VLDL (Very Low Density Lipoproteins) levels, and reduces platelet aggregation, which justifies interest in them for the prevention of coronary illness.

Carbon dioxide is clearly indicated for this application, taking into account its innocuous nature in relation to foodstuffs. The membrane used will preferably be a nano-filtration membrane the cutoff threshold of which is close to 800 g/mole. The light triglycerides, statistically low in C20 and C22, pass through the membrane, while the heavy fraction, rich in C20 and C22 is held back in the retained material/concentrate. The phospholipids, insoluble in $CO_2$, separate and can be removed separately.

The method according to the invention is also applicable in a particularly advantageous manner to the treatment of aqueous phases notably containing proteins such as food proteins, for which, in a surprising way, an effect is observed, referred to as an "anti-clogging" effect, which can be explained in the following manner.

The dissolution, for example of $CO_2$, under the effect of the pressure causes the formation of carbonic acid. This is expressed by an increase in acidity, that is to say by a reduction in pH. For a solubility of the order of 60 g per liter, obtained at P: 300 bars and T: 60° C., the pH is of the order of 3.5.

The resultant acidity has the consequence of modifying the steric conformation of the proteins. In effect, the reduction in the pH causes a charge effect which tends to move the proteins away from their iso-electric point (that is to say the point of zero charge, reached at a pH of around 4 to 5 for most foodstuff proteins). The modification of the pH also tends to move the ceramic that forms the membrane (or any other inorganic or organic material) away from its iso-electric point (reached at pH 5.5 in the case of $TiO_2$). The final and unexpected result is that the proteins mutually repel one another, thereby keeping their conformation in a cushion, and are also repelled by the membrane. The end result is that, the rate of retention is improved while at the same time clogging up is reduced.

Finally, the method according to the invention can also be applied when a nano-filtration is being carried out, with the reduction of the degree of polydispersity of the polyethylene glycols (PEG) or of any other polydisperse polymer.

Another subject of the invention is an installation for the implementation of the method described above.

This installation is characterized in that it comprises means for supplying a viscous liquid and a third substance, means of dissolving the third substance in the viscous liquid, means of tangential filtration, means of transferring and circulating the single phase liquid in order to pass said solution into said means of tangential filtration.

The installation for implementing the method according to the invention additionally and advantageously includes means to lower the pressure of concentrate and permeate, and to separate the permeate from the filtrate and from the third substance and to separate the concentrate from the residue and from the third substance.

The installation also includes means of recycling to the input to the installation, the separated third substance, arising from the separation from the permeate and from the concentrate.

Finally, the installation comprises regulating means for regulating the supply and the tapping off.

This regulation is preferably coupled to the flow rate of the permeate.

Other characteristics and advantages of the invention will better become apparent on reading the description which will follow, which is given purely for illustrative purposes and is non restrictive and which makes reference to the appended drawings on which:

The curves A, B, C, D, E, F correspond respectively to partial pressures of $CO_2$ of 0, 30, 60, 90, 120 and 150 bars.

Figure 3:
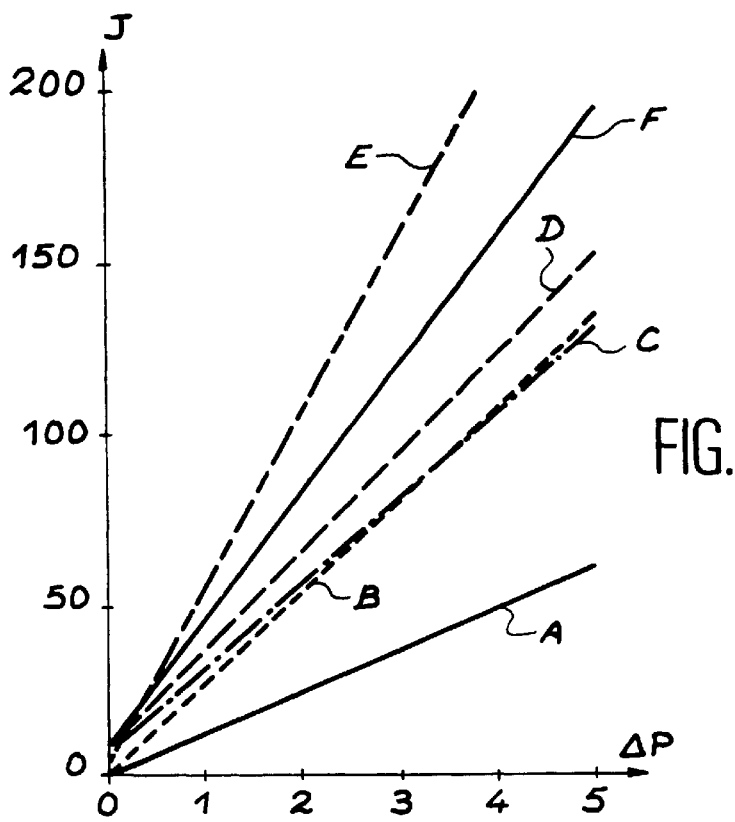

FIG. 3 is a graph which represents the density of the filtrate flow J in $kg/h/m^2$ in relation to the transmembrane pressure $\Delta P$ in bars for the polyethylene glycol 400 to 60° C. on a single channel ultra-filtration membrane.

The curves A, B, C, D, E, F correspond respectively to partial pressures of $CO_2$ of 0, 52, 61, 91, 121 and 151 bars.

Figure 4:
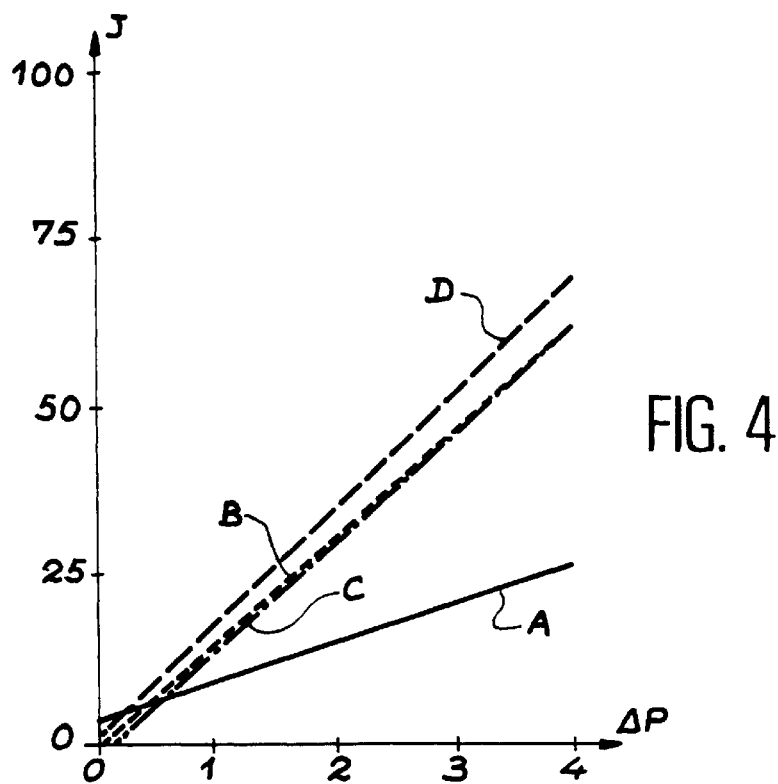

FIG. 4 is a graph analogous to that in FIG. 3 for a temperature of 40° C.

The curves A, B, C, D, correspond respectively to partial pressures of $CO_2$ of 0, 101, 122 and 152 bars.

Figure 5:
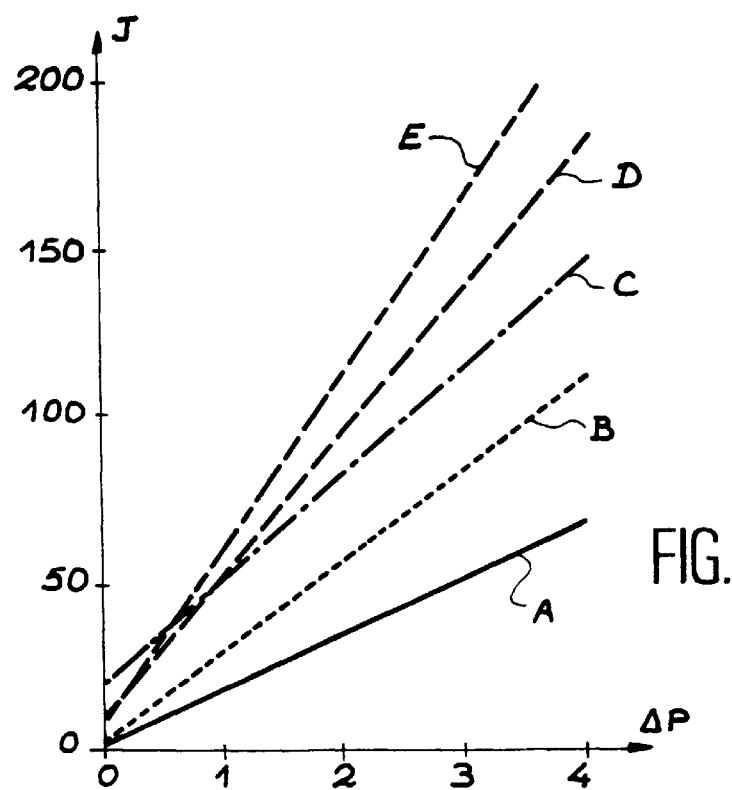

FIG. 5 is a graph analogous to that in FIG. 4 for a temperature of 75° C.

The curves A, B, C, D, E correspond respectively to partial pressures of $CO_2$ of 0, 53, 103, 122 and 153 bars.

Figure 6:
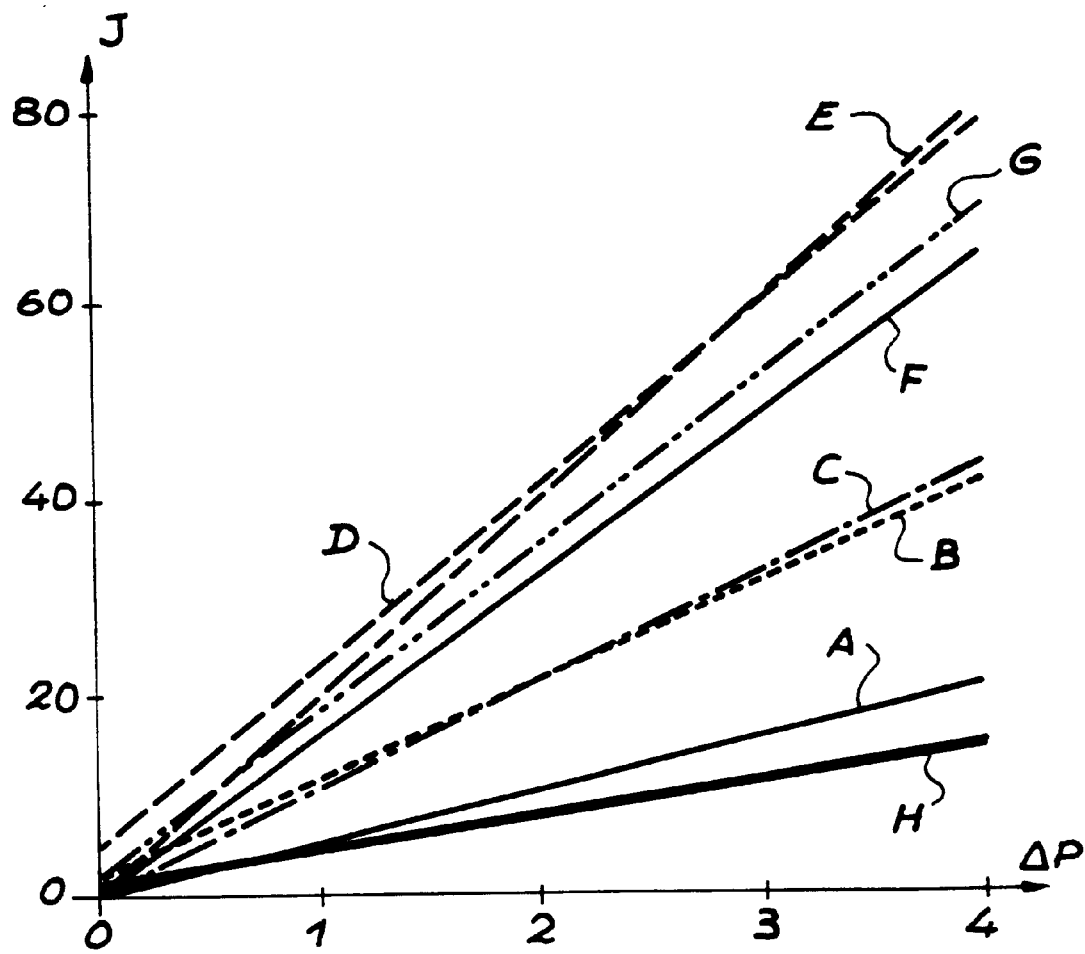

FIG. 6 is a graph which shows the density of the filtrate flow J in $kg/h/m^2$ in relation to the transmembrane pressure $\Delta P$ in bars for new and used motor oil at 75° C. on a multi-channel ultra-filtration membrane.

The curves A, B, C, D, E, F, G correspond respectively to partial pressures of $CO_2$ of 0, 51, 76, 101, 110, 120 and 151 bars and give the results obtained for the new oil.

Curve H corresponds to a partial pressure of $CO_2$ of 101 bars and gives the results obtained for used oil.

Figure 7:
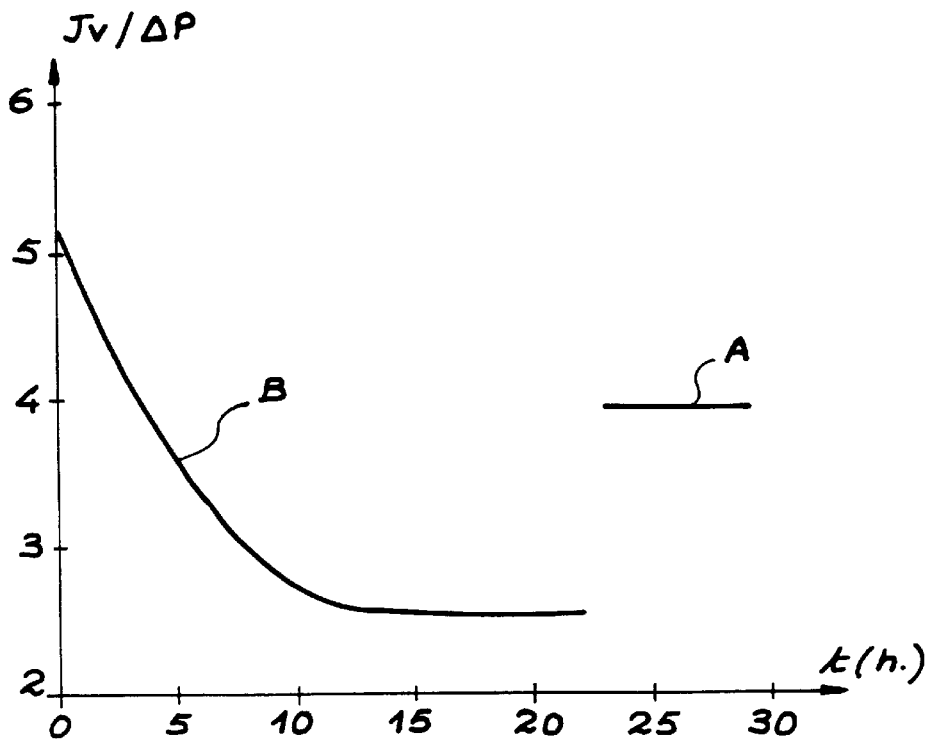

FIG. 7 is a graph representing the change in the permeability to the used oil $J/\Delta P$ in $kg/(h.m^2.bar)$ as a function of time in hours.

The curves A and B correspond respectively to transmembrane pressures $\Delta P$ of 1.5 and 3 bars.

Figure 8:
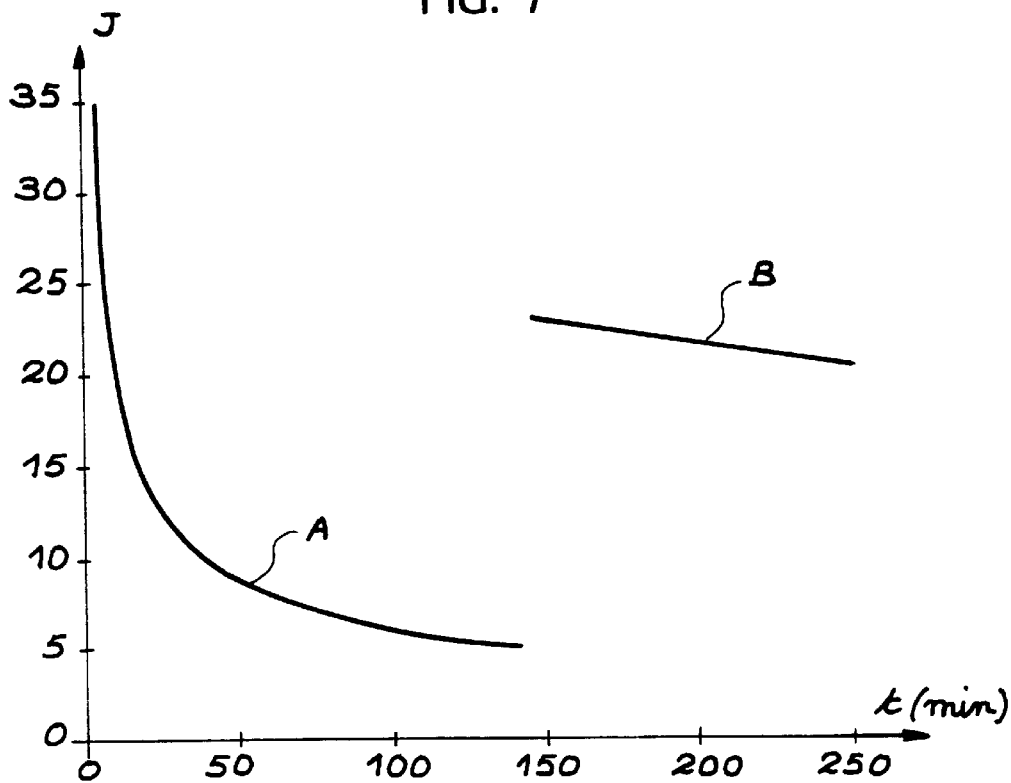

FIG. 8 is a graph representing the change in the density of the filtered flow J in $kg/h.m^2$ in relation to the time in minutes during filtration tests on poor cod oil on an ultra-filtration membrane at 60° C.

Curves A and B correspond respectively to partial pressures of $CO_2$ of 0 bar and of 85 bars.

Figure 1:
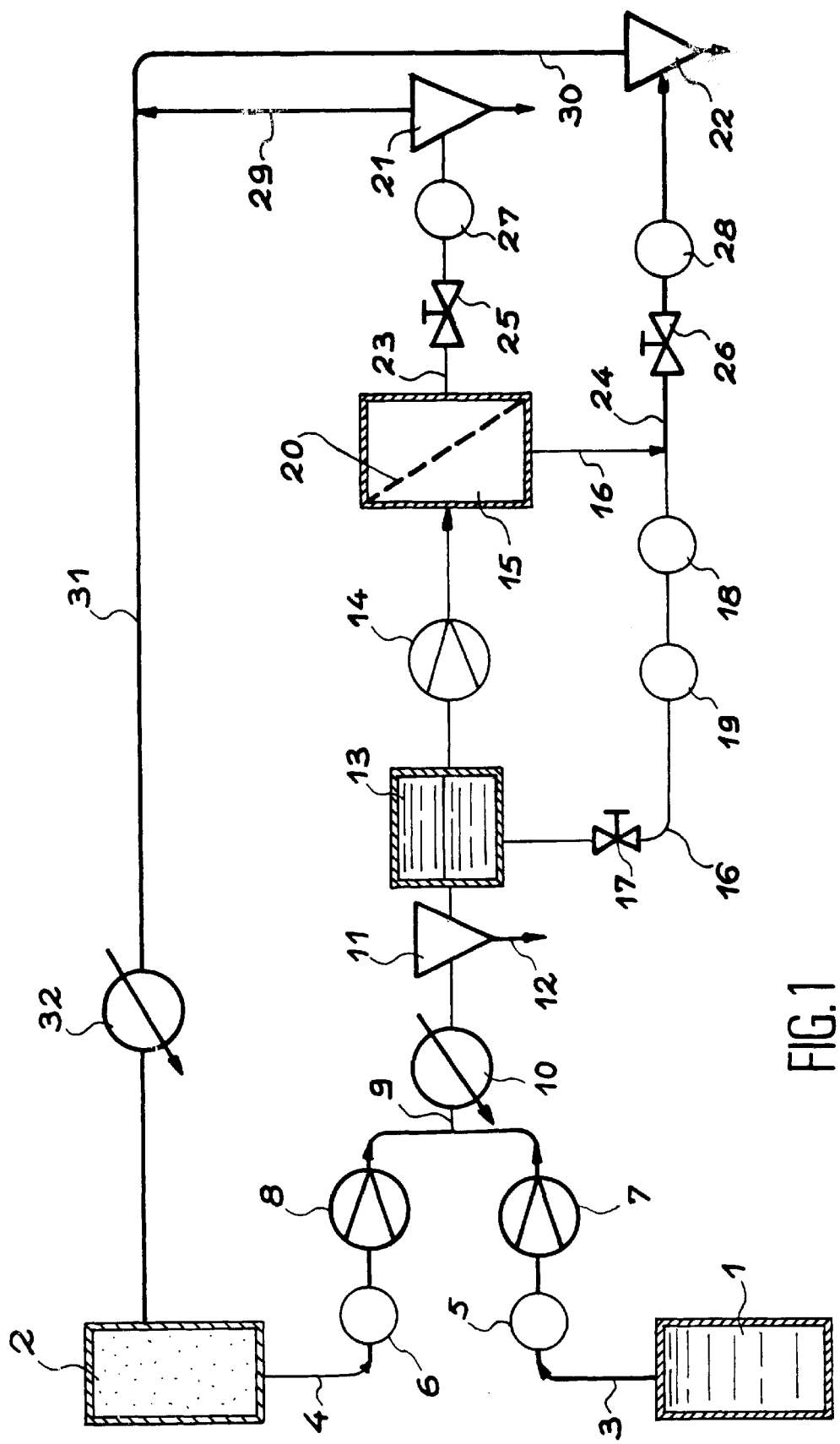
FIG. 1 shows a diagrammatic section view of an example of an installation for implementing the method of tangential filtration under pressure of viscous liquids with the addition of a third substance according to the invention.

The installation for the implementation of the method according to the invention according to a method of continuous operation comprises, according to FIG. 1, means of supplying fluids for a continuous and simultaneous feed of a viscous fluid from which one wishes to separate certain molecular or particulate components by tangential filtration, and a third substance.

The supply means comprise for example a reservoir or tank of viscous liquid 1 and a reservoir of third substance 2 for example $CO_2$, each of these reservoirs is connected by means of a pipe 3, respectively 4, fitted with a flow meter 5, respectively 6, to a pump 7, respectively 8. The two pumps 7 and 8 are preferably dosing pumps coupled so as to keep the proportions of the two fluids constant, even if the total flow rates vary. The type of these pumps may be varied, they can for example be piston pumps, membrane pumps or any other type of pump capable of providing a precise dose of the constituents. In the case where the third substance supplied is in the gaseous state, it can be fed by a compressor (not shown). The supply means can also play the role of other means of pressurization for the whole of the fluids, or the pressurization means for these fluids may also be provided.

Pressurization is provided for example by the pumping systems described above or the pressurization means comprise means of introducing a neutral gas such as helium or nitrogen.

The means of introducing a neutral gas can be a high pressure supply source, constituted by high pressure commercial bottles, or a compressor.

In the case of non-continuous operation or batch operation, the supply means comprise feed pumps for the viscous liquid and the third substance that are shut down once charging has been carried out.

The single phase liquid solution, also called the "liquid phase" that forms in the dissolution means such as the function 9 by dissolution of the third substance in the viscous liquid is then conditioned in conditioning means, for example it is brought to the desired temperature by passage, for example within heating means, for example a heat exchanger 10. The dissolution means can also consist of an in-line injection base or a static mixer.

The installation shown in FIG. 1 additionally comprises pre-treatment means or means of implementing an extra step, consisting of a decantation pot 11 provided for the case where an "anti-solvent" effect occurs that leads to separation of heavy components. These heavy components are then discharged through pipe 12.

The installation for the implementation of the method according to the invention also comprises means of transferring and circulating the single phase liquid solution. These means comprise, for example, a tank forming a liquid phase reservoir 13 and a pump called a recirculation pump 14 which enables the liquid phase to be passed into the tangential filtration means 15.

The recirculation pump 14 can be, for example a paddle pump, a piston pump, a centrifugal pump or a gear pump. The discharge pressure of this pump must be greater than the pressure drop of the circuit including the filtration means such as the membrane or membranes 20, that is to stay typically of the order of 1 to 10 bars depending on the residual viscosity of the liquid phase. This pump also has the purpose of providing a suitable speed of circulation into the tangential filtration means.

The circulation means also preferably include a recirculation loop 16, fitted, for example, with a valve 17 and a flow meter 18. This recirculation loop allows part of the retained material to be circulated within a closed circuit from the liquid phase reservoir to the filtration means until the desired concentration factor has been obtained.

The filtration means 15 comprise, for example, a membrane or an assembly of membranes 20 arranged in a housing or a tangential filtration enclosure. The number of membranes is variable and can range, for example, from 1 to 1000 or more.

Because the tangential filtration can be applied to the separation of particles or of molecules of very different sizes, the membrane(s) used will preferably have cutoff thresholds that are appropriate to the species to be separated. The diameter of the pores, for example, range from about one or more micrometers that is to say 100 $\mu$m to one or more nanometers that is to say 100 $\mu$m, which thereby covers the range of separation given by the micro-filtration, ultra-filtration and nano-filtration membranes.

The membranes used will preferably be made of ceramic or made up of metal oxides such as $Al_2O_3$, $ZrO_2$, $TiO_2$. The membranes will preferably be made of alumina, but membranes with a carbon support can be used and even organic membranes such as polysulfone membranes of the "Nafion®" type, always of course with the condition that this membrane is chemically resistant to the third substance.

The installation described also includes means to lower the pressure of the concentrate and the permeate (depressurize) and to separate the permeate from the filtrate and from the third substance, and to separate the part of the retained material called the "concentrate" from the residue and from the third substance.

These pressure reducing and separation means essentially comprise separator "pots" of the traditional technology 21, 22 such as those typically used in processes that make use of a super-critical fluid. They may, for example be separators of the de-aerator, type or of the kinetic type (cyclone separator).

The separators are supplied with permeate and concentrate by pipes 23, 24, fitted respectively with valves 25 and 26 and flow meters, for example mass flow meters 27 and 28.

Only a part of the flow of retained material is discharged as concentrate, and then separated in the concentrate separator 22. For example, if a concentration factor of 10 has been fixed, 10% of the retained material is discharged to provide the concentrate, the latter yielding the residue and the third substance while the remainder of the retained material will be recirculated.

According to the invention, preferably, the installation further comprises recycling means for the third substance stemming from the separation from the permeate and from the concentrate, to the installation input, that is to say to the third substance reservoir 2. These means include the pipes 29, 30 and 31.

In the case of supply by pump, the temperature is preferably adjusted by using heat exchange means such as a cold exchanger provided upstream from the third substance reservoir, for example a liquefied gas reservoir. Hence for $CO_2$ at 50 bars, the temperature will be brought to 10° C. using the exchanger 32.

Finally the installation comprises regulation means. In effect in a continuous process, the concentrate and the permeate are discharged simultaneously in such a way that the inlet/outlet material balance is at any time in equilibrium. This is the role of the regulation of the feed and tapping off systems. Overall, this regulation will be linked to the flow rate of the permeate.

At a constant transmembrane pressure, the flow rate of the permeate depends on the operating conditions chosen and also on the behavior of the membrane. It is known that this behavior varies, of itself, notably through the effect of clogging. The way the installation behaves will therefore be dependent on fluctuations in the flow rate of the permeate. Therefore it is this flow rate which will control the input of fluids, namely the third substance and the viscous liquid, as well as the output of the concentrate.

The regulation directly linked to the permeate is essentially the transmembrane pressure, as in any tangential filtration process.

Furthermore, the flow rate of concentrate is detected by a mass flow meter. For a chosen concentration factor of 10, and assuming that the solubility of the third substance such as $CO_2$ does not vary between the permeate and the concentrate, 90% of the material entering will be discharged in the permeate and 10% in the concentrate. The flow meter installed at the permeate outlet then allows one to servo-operate the opening of the concentrate valve to this ratio.

In order to bring the input/output material balance into equilibrium, the feed pumps 7, 8 are servo-operated to the sum of the output flow rates, either directly through the flow meters 27, 28 or by a constant level in the charge pot 13 (only in the case where one is operating by pressurizing the liquid phase with a gas), or at constant pressure in the recirculation loop when it is entirely full of liquid phase.

The fluidity of the retained material can be optimized by servo-operating the feed pump for the third substance 8 to the viscosity measurement. The proportion of the third substance to the liquid is modified until the viscosity level is reached. This possibility allows one to operate at an optimum viscosity whatever changes intervene during the course of time, for example: changes in the concentration of the liquid phase, in the nature of the supply etc.

Once the minimum viscosity is reached, one can servo-operate the flow rate from the recirculation pump 14 to the measurement of the pressure drop caused by drag between the inlet and the outlet of the membrane so as to work under the restriction of a constant partition. This way of operating has become the usual way of working in atmospheric tangential filtration.

The method of the invention will now be described with the help of the following examples given for illustrative purposes and which are non restrictive.

EXAMPLES

The tangential filtration tests have been carried out using an installation having substantially the configuration already described above and adapted for operation in a non-continuous fashion or with batches.

The boiler engineering and the piping are provided for operation at a maximum pressure of 350 bars and a temperature of 100° C.

Two types of membrane support were used; a single channel cylindrical support made of α-alumina manufactured by the company SCT/US Filter and a multi-channel support in the shape of a clover leaf manufactured in a mixture of $TiO_2/ZrO_2/Al_2O_3$ and marketed by the company TAMI.

The ultra-filtration tests were carried out with:
- an SCT membrane of cylindrical geometry and of pore diameter 20 nm.
- a TAMI membrane of clover-leaf geometry, of pore diameter 50 nm.

The nano-filtration tests were carried out on a membrane manufactured by the CEA from an SCT cylindrical support. The filtering layer made of $TiO_2$ has a mean pore diameter of 3 nm.

The liquids studied are polyethylene glycols of molecular mass 400 g/mole supplied by the company Sigma/Aldrich as well as new or used motor oils and finally fish oils.

Pressurization is carried out with helium supplied by the company Prodair which allows a variable transmembrane pressure to be provided with a partial pressure of $CO_2$ equal to 0. In the contrary case, the pressure is given by the carbon dioxide itself supplied by the company Air Gaz, supplied by a pump driven by compressed air which is a Haskel DSF 52 General Pneumatic pump.

The transmembrane pressure difference is detected by a Rosemount A 1151 differential pressure sensor. This pressure is regulated by a Kämmer 81037 needle valve controlled pneumatically. The regulation is effected by a Eurotherm 818 regulator.

The membrane is contained in a high pressure membrane carrier situated within a temperature-controlled enclosure.

The circulation pump is a Micropump Series 5000 gear pump, the gaskets of which have been modified.

The flow meter is a Deltatube pressure drop system (Midwest 300 probe). The filtrate flow rate is measured by a "balance plus chronometer system". The flow rate of gas is read on a gas volume counter of the "Flonic" type from the company Schlumberger.

Example 1

This example illustrates the tangential filtration of model compounds PEG 400 (polyethylene glycol) the molar mass of which is 400 g.

The flow rates of permeate PEG and $CO_2$ are measured separately, in relation to the operating conditions which are mainly the partial pressure of $C_2$, the temperature and the transmembrane pressure. The flow rate of the retained material is kept to a laminar condition in the membrane.

The results will be expressed as a mass flow density and a mass permeability.

For the PEG, the units are respectively kg of PEG per hour and per square meter ($kg.h^{-1}.m^{-2}$) and kg of PEG per hour, per square meter and per bar of transmembrane pressure ($kg.h^{-1}.m^{-2}.bar^{-1}$).

A) Filtration of PEG 400 on a Nano-filtration Membrane at 60° C.

The tests were carried out at the following partial pressures of $CO_2$: 0, 30, 60, 90, 120, 150 bars.

The circulation of the retained material is regulated in such a way that the regime is a laminar one in the membrane. The transmembrane pressure varies from 5 to 30 bars.

Figure 2:
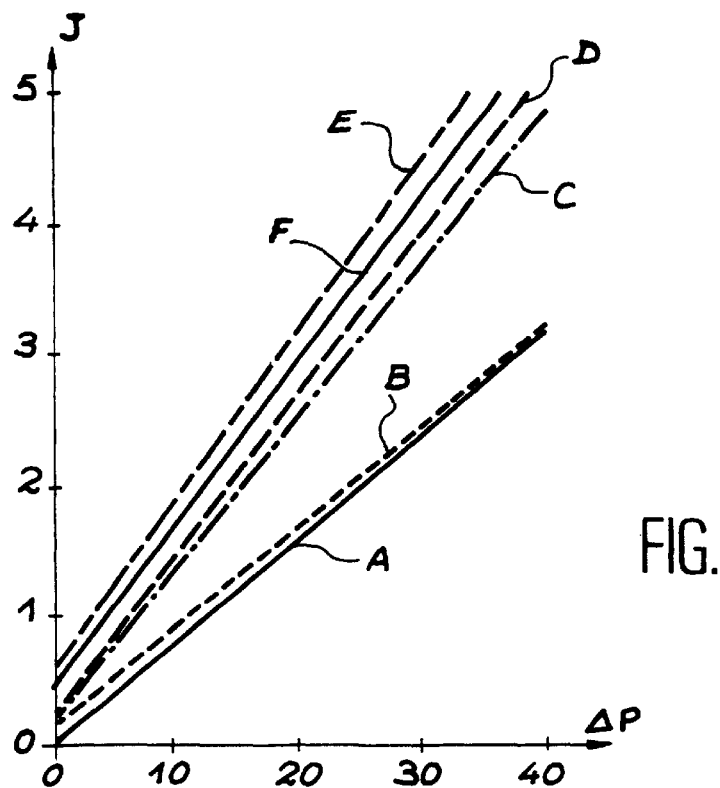
FIG. 2 is a graph which shows the density of the filtrate flow J in $kg/h/m^2$ in relation to the transmembrane pressure $\Delta P$ in bars for the polyethylene glycol 400 to 60° C. on a nano-filtration membrane.

The results are gathered together in Table I below and are represented on the graph in FIG. 2 where the flow densities are shown as a function of the transmembrane pressure (in bars).

The curves A, B, C, D, E, and F correspond respectively to partial pressures of $CO_2$ of 0, 30, 60, 90, 120, 150 bars.

B) Filtration of PEG 400 on an Ultra-filtration Membrane at 60° C.

The test conditions are the same as in paragraph A) but for transmembrane pressures compatible with the ultra-filters, being from 0.2 to 4 bars.

The results are gathered together in Table I below and are represented on the graph in FIG. 3 where the flow densities (kg/h/m$^2$) are shown as a function of the transmembrane pressure (in bars).

The curves A, B, C, D, E, and F correspond respectively to partial pressures of $CO_2$ of 0, 52, 61, 91, 121 and 151 bars.

TABLE I

Comparison of the flow densities between nano-filtration and ultra-filtration membranes at 60° C.

| Nano-filter 3 | | | Ultra-filter | | |
|---|---|---|---|---|---|
| Pressure of $CO_2$ P(bar) | Trans-membrane pressure $\Delta$P(bar) | Flow density of PEG J(kg/h.m$^2$) | Pressure of $CO_2$ P(bar) | Trans-membrane pressure $\Delta$P(bar) | Flow density of PEG J(kg/h.m$^2$) |
| 0 | 5 | 0.41 | 0 | 0.8 | 10.45 |
|   | 10 | 0.81 |   | 0.17 | 21.36 |
|   | 15 | 1.21 | 52 | 0.2 | 2.58 |
|   | 20 | 1.65 |   | 0.8 | 21.51 |
|   | 30 | 2.44 |   | 1 | 27.20 |
| 30 | 10 | 1.07 |   | 1.5 | 37.46 |
|   | 20 | 1.67 |   | 1.6 | 44.39 |
|   | 30 | 2.37 | 61 | 0.4 | 20.76 |
| 60 | 10 | 1.44 |   | 0.8 | 31.36 |
|   | 20 | 2.63 |   | 1.2 | 39.09 |
|   | 30 | 3.61 |   | 1.6 | 50.00 |
| 90 | 10 | — |   | 2 | 57.73 |
|   | 20 | 3.09 |   | 2.3 | 61.36 |
|   | 30 | 3.88 | 91 | 0.3 | 24.55 |
| 120 | 10 | 2.74 |   | 0.4 | 20.83 |
|   | 20 | 3.27 |   | 0.5 | 27.73 |
|   | 30 | 4.33 |   | 0.8 | 38.64 |
| 150 | 10 | 2.07 |   | 1.2 | 42.05 |
|   | 20 | 3.13 |   | 1.6 | 54.55 |
|   | 30 | 4.12 | 121 | 0.3 | 21.25 |
|   |   |   |   | 0.5 | 36.36 |
|   |   |   |   | 0.8 | 40.45 |
|   |   |   |   | 1.2 | 75.23 |
|   |   |   |   | 1.6 | 84.09 |
|   |   |   | 151 | 0.5 | 33.25 |
|   |   |   |   | 1 | 47.66 |
|   |   |   |   | 1.4 | 59.09 |
|   |   |   |   | 2 | 86.29 |
|   |   |   |   | 4 | 157.95 |

In both cases, ultra-filtration and nano-filtration, the maximum flow is reached at 120 bars.

For the nano-filtration membrane, the improvement factor brought about by dissolving the $CO_2$ reaches 1.7.

For the ultra-filtration membrane, the improvement factor brought about by dissolving the $CO_2$ reaches 4.2.

At 60° C., and for similar $CO_2$ partial pressure values, the increase in permeability between the nano-filtration membrane and the ultra-filtration membrane increases by a factor of 4.2/1.7=2.5.

C) Filtration of PEG 400 on an Ultra-filtration Membrane at 40° C.

The test conditions are the same as in paragraph B above, except with regard to the temperature. The results are gathered together in Table II below and are represented on the graph in FIG. 4 where the curves A, B, C and D correspond respectively to partial pressures of $CO_2$ of 0, 101, 122 and 152 bars.

Under these operating conditions, it appears that the maximum permeability is reached at a partial pressure of $CO_2$ equal to 150 bars. Nevertheless these values are not very different from the flow densities at 100 and 120 bars.

The improvement bactor brought about by the presence of dissolved $CO_2$ is of the order of 3 against 4.2 at 60° C.

TABLE II

PEG 400 flow densities for an ultra-filtration membrane at 40° C.

| Pressure of $CO_2$ P(bar) | Transmembrane pressure $\Delta$P (bar) | PEG flow density J(kg/h · m$^2$) |
|---|---|---|
| 0 | 0.7 | 7 |
|   | 0.8 | 12 |
|   | 1.7 | 13 |
|   | 4 | 26 |
| 101 | 1.2 | 15 |
|   | 2.5 | 38 |
|   | 4 | 64 |
|   | 6 | 94 |
| 122 | 1,4 | 18 |
|   | 3 | 50 |
|   | 4.5 | 71 |
|   | 6 | 92 |
| 152 | 3 | 56 |
|   | 4 | 64 |
|   | 6 | 105 |

D) Filtration of PEG 400 on an Ultra-filtration Membrane at 75° C.

The test conditions are the same as in paragraph B above. The results are gathered together in Table III below and are represented on the graph in FIG. 5 where the curves A, B, C, D and E correspond respectively to partial pressures of $CO_2$ of 0, 53, 103, 122 and 153 bars. The maximum permeability is reached for a partial pressure of $CO_2$ equal to about 150 bars.

The improvement factor brought about by the dissolved $CO_2$ reaches a maximum of 3.1.

TABLE III

PEG 400 flow densities on an ultra-filtration membrane at 75° C.

| Pressure of $CO_2$ P(bar) | Transmembrane pressure $\Delta$P (bar) | PEG flow density J(kg/h · m$^2$) |
|---|---|---|
| 0 | 0.8 | 17 |
|   | 1.7 | 29 |
| 53 | 0.2 | 11 |
|   | 0.5 | 20 |
|   | 0.8 | 27 |
|   | 1.2 | 35 |
| 103 | 0.4 | 30 |
|   | 0.8 | 51 |
|   | 1.6 | 84 |
|   | 3 | 108 |
| 122 | 0.5 | 25 |
|   | 1 | 58 |
|   | 2 | 73 |
|   | 3 | 101 |
|   | 4 | 145 |
| 153 | 0.4 | 37 |
|   | 0.8 | 45 |
|   | 1.2 | 72 |
|   | 1.6 | 95 |

From the set of results obtained with PEG 400 in Example 1, it emerges that under the same operating conditions, the third substance plays a more favorable part for membranes with "large pores" (ultra-filtration) than for membranes with "small pores" (nano-filtration). This improvement is not therefore significant solely from the viscosity effect. In effect, in the case of nano-filtration, the pore radius of the membrane ($\approx$1.5 nm) is getting close to the size of the PEG molecule. Interactions exist between the pore wall and the polymer. This is no longer true with the ultra-filtration membrane which has a pore radius of 10 nm. These interactions can be steric,—due to the volume taken up by the molecule—or can be surface interactions—due to physico-chemical phenomena.

As for the effect of temperature on the permeability; if in the absence of $CO_2$ the ratio of permeabilities $J/\Delta P$ (that is to say the slopes of the flow density lines) are practically in inverse ratio to the viscosities, in the presence of $CO_2$ this relationship is no longer valid.

In effect, the phenomenon of dilution by the third substance is then super-imposed on the phenomenon of viscosity reduction.

It is understood that there is interest in diluting the permeate flow to the least degree possible to provide a flow of filtrate ultimately; that is to say, the "permeate flow" minus the "third substance flow" should be as high as possible.

The maximum filtrate flow will then be the result of an optimum between the lowering of the viscosity and the increase in the volume dilution. This optimum is achieved in the region of 120 to 150 bars.

The maximum improvement factor obtained at different temperatures remains roughly constant and is between 3 and 4.

Example 2

This Example illustrates tangential ultra-filtration of new or used commercial motor oils.

The new oil is an ESSO brand SAE 15W 40 type, with a kinematic viscosity of 40 cSt at 40° C., and a dynamic viscosity of 5.1 mPa·s at 100° C. in accordance with the standard SAEJ 300 (16). The viscosity obtained at other temperatures can be estimated from ASTM charts. The results obtained are collected together in Table IV which follows:

TABLE IV

| Temperature ° C. | 40 | 60 | 75 | 100 |
|---|---|---|---|---|
| Kinematic viscosity cSt | 40 | 17 | 11 | 5.6 |
| Dynamic viscosity mPa · s | 37 | 16 | 10 | 5.1 |

The used oil corresponds to oil that was initially a 15W40 oil drained from a petrol automobile after 10,000 km of use, the automobile having been driven a total distance of 80,000 km. This corresponds to an engine with average wear.

A) Filtration of New Oil on a "TAMI" Membrane at 75° C.

The tests were carried out at the following partial pressures of $CO_2$: 0, 51, 76, 101, 110, 120 and 151 bars.

The results are gathered together in Table V below and are represented on the graph in FIG. 6 where the flow densities J are plotted as a function of the transmembrane pressure $\Delta P$ (in bars).

The curves A, B, C, D, E, F and G correspond to partial pressures of $CO_2$: 0, 51, 76, 101, 110, 120 and 151 bars.

TABLE V

| Pressure of $CO_2$ P(bar) | Transmembrane Pressure $\Delta P$ (bar) | PEG flow density $J(kg/h \cdot m^2)$ |
|---|---|---|
| 0 | 0.5 | 1.1 |
|  | 1.0 | 6.5 |
|  | 3.0 | 15.5 |
|  | 4.5 | 14.7 |
|  | 6.0 | 13.6 |
| 51 | 1.0 | 13.6 |
|  | 2.0 | 20.9 |
| 76 | 1.0 | 10.9 |
|  | 2.0 | 22.0 |
| 101 | 0.5 | 17.0 |
|  | 1.0 | 22.1 |
|  | 1.5 | 36.8 |
|  | 3.0 | 59.1 |
| 110 | 1.0 | 20.5 |
| 120 | 1.0 | 16.5 |
| 151 | 1.3 | 26.4 |
|  | 2.1 | 36.4 |
|  | 5.0 | 60.9 |

B) Filtration of Used Oil on a "TAMI" Membrane at 75° C.

The operating conditions were the same as in paragraph A above but a partial pressure of $CO_2$ of 101 bars was used and transmembrane pressures of from 3 to 1.5 bars were applied.

The results are gathered together in Table VI below and are represented in FIG. 6 where the line H describes the value of the stabilized flow density of the used oil for a $CO_2$ pressure equal to 101 bars. This is the line of least slope.

TABLE VI

| Pressure of $CO_2$ P(bar) | Transmem Brane Pressure $\Delta P$ (bar) | Duration of the test t (hours) | Oil flow density $J(kg/h \cdot m^2)$ | Permeability $J/\Delta P(kg/h \cdot m^2 \cdot bar)$ |
|---|---|---|---|---|
| 100 | 3 | 0.5 | 16.00 | 5.3 |
|  |  | 1 | 16.00 | 5.3 |
|  |  | 2 | 11.17 | 3.7 |
|  |  | 3 | 11.82 | 3.9 |
|  |  | 4 | 11.27 | 3.8 |
|  |  | 6 | 10.81 | 3.6 |
|  |  | 7 | 9.29 | 3.1 |
|  |  | 10 | 8.79 | 2.9 |
|  |  | 14 | 7.86 | 2.6 |
|  |  | 17 | 7.88 | 2.6 |
|  |  | 20 | 9.17 | 3.1 |
|  | 1.5 | 25 | 5.95 | 4.0 |
|  |  | 28 | 5.80 | 3.9 |

The change in the permeability to the used oil over the course of time is shown in FIG. 7.

Curves A and B correspond respectively to transmembrane pressures of $\Delta P$ of 1.5 and 3 bars.

The change in permeability over the course of time stabilizes itself around 2.6 $kg.h^{-1}.m^{-2}.bar^{-1}$ under a transmembrane $\Delta P$ of 3 bars but reaches 3.9 $kg.h^{-1}.m^{-2}.bar^{-1}$ under a $\Delta P$ of 1.5 bars.

Example 3

This example illustrates the tangential filtration of fish oil.

The treated fish oil is poor cod oil.

The poor cod is a fish of the gadidae family, close to the cod. The raw oil that arises from pressing the flesh, and obtained after decantation, is rich in C20 and C22 polyunsaturated fatty acids, notably eicosapenta-enoic acid (EPA) and docosahexa-enoic acid (DHA) which are of potential interest in the prevention of cardiovascular illness. The enrichment of the triglyceride fraction of the oil containing these long chain, fatty acids is possible through nano-filtration. The lowering of the viscosity is obtained, as in the previous examples by dissolution of carbon dioxide under pressure.

So as to study the hydrodynamic behavior of the oil and the $CO_2$ in a porous medium, the tests were carried out on an SCT 20 nm ultra-filtration membrane.

The operating conditions were $CO_2$ pressure: 85 bar

Transmembrane pressure: 5 bar

Temperature: 60° C.

The results obtained are shown on the graph in FIG. 8 where the variation in flow density is shown as a function of time.

The curves A and B correspond respectively to partial pressures of $CO_2$ of 0 bar and 85 bars.

After a large reduction in the flow rate of filtrate equivalent to that observed during the treatment of the motor oil on the SCT membrane, the introduction of $CO_2$ at t=150 minutes causes an immediate effect: the flow of filtrate immediately changes from 5 kg/h.m$^2$ to a value between 20 and 25 kg/h.m$^2$.

The improvement factor immediately obtained is therefore between 4 and 5.

Under the operating conditions used, the proportion of $CO_2$ is 20%.

Example 4

This example is a comparative example with the purpose of comparing the energy efficiency of the filtration of motor oil by the process called the REGELUB® process described above and by the method according to the invention using the dissolution of a third substance.

The direct comparison between the Poiseuille formula which describes the laminar condition and the Blasius formula which describes the turbulent condition would give a ratio of the pressure drop due to drag of the order of 200 times greater for the turbulent condition, that is to say for the Regelub process.

However this is not realistic; particularly if one takes into account, not only the pressure drops in the membrane but also those in the entire recirculation circuit.

In this case, taking into account the various uneven parts in the piping, it is reasonable to compare regimes that are turbulent overall using the Blasius formula below:

$$\frac{\Delta P}{L} = 0.0395 \cdot U^{1.75} \cdot \rho^{0.75} \cdot \mu^{-0.25} \cdot D^{-1.25}$$

where $\mu$ represents the viscosity in Pa·s $\rho$ represents the density in kg/m$^3$ U represents the speed in m/s D represents the hydraulic diameter in m $$\frac{\Delta P}{L}$$

represents the pressure drop per unit of length

Our tests were carried out with a clover-leaf membrane, for a mean speed of the order of 0.5 m/s to 1 m/s and a viscosity of the order of 4 mPa·s, giving a mean permeability $L_P$ of 4 kg.h$^{-1}$.m$^{-2}$.bar$^{-1}$.

The mean result given by the REGELUB® process, namely 13 kg.h$^{-1}$.m$^{-2}$.bar$^{-1}$ has been provided with a membrane of circular section for speeds of from 5 to 7 m/s with viscosities of the order of 1 mpa.s.

The operating conditions for each of the methods are given more precisely in Table VII below

TABLE VII

|  | Regelub Process | Method with a third substance (invention) |
|---|---|---|
| $\mu$ (mPa · s) | 1 | 4 |
| $\rho$ (kg/m$^3$) | 900 | 900 |
| U (m/s) | 5 | 1 |
| D (m) | 7 × 10$^{-3}$ | 3.6 × 10$^{-3}$ |
| Lp oil (kg · h$^{-1}$ · m$^{-2}$ · bar$^{-1}$) | 13 | 4 |

The hypothesis is also formulated that the density in the presence of $CO_2$ under pressure practically does not change, as is the case for the PEGs.

Under these conditions, and with these hypotheses which are very unfavorable for the method with the third substance according to the invention, finally one obtains a ratio of pressure drops 10.3 times greater for the Regelub Process.

This figure is to be compared with the permeabilities for the oil, the ratio of which is as follows:

$$13 \text{ kg.h}^{-1}.\text{m}^{-2}.\text{bar}^{-1}{}_{(regelub)}/4 \text{ kg.h}^{-1}.\text{m}^{-2}.\text{bar}^{-1}{}_{(third\ substance)} \approx 3.25$$

With the hypotheses mentioned and assuming that the major part of the energy is consumed by the drag forces, (one can also assume that the energy for reheating to 300° C. for the Regelub Process is equivalent to the energy for injection and for recycling the $CO_2$ in the method with the third substance), comparing the energy gives a result of 10.3/3.25 or 3.2 times more favorable for the filtration method which lowers the viscosity by using a third substance according to the invention.

The general conclusion from these examples is that the method and the installation according to the invention, for very moderate temperatures, for example of the order of 80° C. and for all the viscous liquids treated, an improvement factor for the permeability to the filtrate of the order of 3 to 5 is possible in relation to filtration without a third substance at the same temperatures.

For the used motor oils, the improvement factor for the filtration at 75° C. brought about by the dissolution of $CO_2$ is of the order of 4, while the permeability of the membrane reaches a value of 4 kg.h$^{-1}$.m$^{-2}$.bar$^{-1}$ but it is obtained under conditions that are much less drastic than the very severe conditions of the REGELUB® Process, that is to say a temperature of 300° C. and a circulation speed of 5 to 7 m/s. Because of this, the energy efficiency of the method according to the invention is 3.2 times more favorable and the safety and the reliability of the process and of the installation according to the invention are clearly better.

What is claimed is:

1. Method of filtration of a viscous liquid, said viscous liquid comprising at least one heavy component and at least one light component, and having an initial viscosity under the ordinary conditions of 0.01 Pa·s. to 1 Pa·s, said method being characterized in that, under the effect of pressure, a super-critical substance in the super-critical state is dissolved in the viscous liquid, this super-critical substance having a viscosity lower than that of said viscous liquid, yielding a single phase liquid solution having a lower viscosity in comparison with the initial viscosity of the pure viscous liquid, said single phase liquid solution being treated under pressure by tangential filtration to produce a retained material comprising a portion of the super-critical substance and the heavy component, and a permeate comprising a portion of the super-critical substance and the light components.

2. Method according to claim 1 characterized in that the super-critical substance is chosen from among compounds that are gaseous under ordinary conditions of temperature and pressure and are non-reactive to the viscous liquid.

3. Method according to claim 2 characterized in that the super-critical substance is chosen from among, carbon dioxide, helium, nitrogen, nitrogen monoxide, sulfur hexafluoride, gaseous alkanes with from 1 to 5 carbon atoms, gaseous alkenes having from 2 to 4 carbon atoms, gaseous alkynes having from 2 to 4 carbon atoms, gaseous dienes, gaseous chlorinated and/or fluorinated hydrocarbons, and their mixtures.

4. Method according to claim 1 characterized in that the super-critical substance is chosen from among compounds that are liquid under ordinary conditions of temperature and pressure and are non-reactive to the viscuous liquid.

5. Method according to claim 4 characterized in that the super-critical substance is chosen from among liquid alkanes with from 5 to 20 carbon atoms, liquid alkenes with from 5 to 20 carbon atoms, liquid alkynes with from 4 to 20 carbon atoms, alcohols, ketones, ethers, esters, liquid chlorinated and/or fluorinated hydrocarbons or their mixtures.

6. Method according to claim 1 characterized in that the single phase liquid solution has a viscosity of about from one tenth to about one hundredth of the initial viscosity of the pure viscous liquid.

7. Method according to claim 1 characterized in that the temperature of filtration is from 20 to 200° C.

8. Method according to claim 1 characterized in that said viscuous liquid is circulated a at the speed of 0.5 to 10 m/s.

9. Method according to claim 8 characterized in that the speed of circulation is from 1 to 5 m/s.

10. Method according to claim 1 characterized in that the working pressure is from 30 to 500 bars.

11. Method according to claim 10 characterized in that the working pressure is from 50 to 300 bars.

12. Method according to claim 1 characterized in that the pressure is provided by the pressure of an excess of the super-critical substance added to said viscous liquid in a gaseous or supercritical state.

13. Method according to claim 1 characterized in that the pressure is provided by adding a neutral gas other than the third substance.

14. Method according to claim 1 additionally characterized in that said concentrate, and the permeate, are treated by lowering the pressure, such that the permeate is separated into a filtrate comprising light components and into a portion of the super-critical substance, and the concentrate is separated into a residue comprising heavy components and into a portion of the super-critical substance.

15. Method according to claim 14 characterized in that said lowering of the pressure is carried out in several steps.

16. Method according to claim 14 characterized in that the super-critical substance arising from the separation treatments of the permeate and the concentrate is recycled to the method.

17. Method according to claim 1 characterized in that the super-critical substance is in excess in relation to the single phase liquid solution.

18. Method according to claim 1 characterized in that the tangential filtration is a micro-filtration or an ultra-filtration or a nano-filtration.

19. Method according to claim 1 characterized in that the viscous liquid is chosen from among heat sensitive fluids or liquids or fluids or liquids containing heat sensitive products, mineral oils, industrial process oils and fluids, motor oils, used oils, fluids charged with particles and/or heavy compounds, or petroleum oils.

20. Method according to claim 19 characterized in that the said heat sensitive fluids or liquids are chosen from among animal oils, vegetable oils, body fluids, food products, liquids arising from agriculture and aqueous phases containing proteins.

21. Method according to claim 1 characterized in that said method is carried out in a non-continuous manner.

22. Method according to claim 1 characterized in that said method is carried out in batches.

23. Method according to claim 1, wherein said method is applied to the treatment of used oils with a view to recycling them.

24. Method according to claim 1, wherein said method is applied to the separation of catalyst fines and/or asphaltenes from a petroleum fraction in a catalytic cracking process.

25. Method according to claim 1, wherein said method is applied to the enrichment of the triglyceride fraction of a fish oil with C20 and C22 polyunsaturated fatty acids.

26. Method according to claim 1, wherein said method is applied to the treatment of aqueous phases containing proteins.

* * * * *

UNITED STATES PATENT AND TRADEMARK OFFICE
CERTIFICATE OF CORRECTION

PATENT NO.    : 6,331,253 B1                                              Page 1 of 2
DATED         : December 18, 2001
INVENTOR(S)   : Schrive et al.

It is certified that error appears in the above-identified patent and that said Letters Patent is hereby corrected as shown below:

Column 1,
Line 59, please delete "mPa·s", and insert therefor -- mPa.s --.

Column 3,
Line 38, please delete "mPa·s", and insert therefor -- mPa.s --.
Lines 65 and 66, please delete "Pa·s", and insert therefor -- Pa.s --.

Column 4,
Line 8, please delete "Pas", and insert therefor -- Pa.s --.
Lines 30 and 61, please delete "Pa·s" (first occurrence), and insert therefor -- Pa.s --
Lines 30 and 61, please delete "Pa·s" (second occurrence), and insert therefor -- Pa.s --.

Column 5,
Lines 17 and 27, please delete "Pa·s", and insert therefor -- Pa.s --.

Column 7,
Line 34, after "butene", please insert -- .. --     (two periods).

Column 8,
Line 35, please delete "mPa·s", and insert therefor -- mPa.s --.

Column 12,
Line 44, after "de-aerator", please delete -- , -- (comma).

Column 14,
Line 46, please delete "$C_2$", and insert therefor -- $CO_2$ --.
Line 55, please delete "Nano-filtration Membrane'", and insert therefor -- nano-filtration membrane --.

Column 15,
Lines 1 and 56, please delete "Ultra-filtration Membrane" , and insert therefor
-- ultra-filtration membrane --.

Column 16,
Table II, line 10, please delete "$J(kg/h \cdot m^2)$", and insert therefor -- $J(kg/h,m^2)$ --.
Line 24, please delete "Ultra-filtration Membrane", and insert therefor -- ultra-filtration membrane --.
Table III, line 42, please delete "$J(kg/h \cdot m^2)$", and insert therefor -- $J(kg/h,m^2)$ --.

UNITED STATES PATENT AND TRADEMARK OFFICE
CERTIFICATE OF CORRECTION

PATENT NO.     : 6,331,253 B1
DATED          : December 18, 2001
INVENTOR(S)    : Schrive et al.

It is certified that error appears in the above-identified patent and that said Letters Patent is hereby corrected as shown below:

Column 17,
Line 38, please delete "mPa·s", and insert therefor -- mPa.s --.
Table IV, line 51, "mPa·s", and insert therefor -- mPa.s --.
Line 58, please delete "New Oil", and insert therefor -- new oil --.
Line 58, please delete "Membrane", and insert therefor -- membrane --.

Column 18,
Table V, line 5, please delete "J(kg/h · $m^2$)", and insert therefor -- J(kg/h.$m^2$) --.
Line 23, please delete "Used Oil", and insert therefor -- used oil --.
Line 23, please delete "Membrane", and insert therefor -- membrane --.
Table VI, line 36, please delete "J(kg/h · $m^2$)", and insert therefor -- J(kg/h.$m^2$) --.
Table VI, lines 35 and 36, please delete "J/AP(kg/h · $m^2$ · bar)", and insert therefor -- J/AP(kg/h.$m^2$ .bar) --.

Column 19,
Line 54, please delete "Pa·s" and insert therefor -- Pa.s --.
Line 66, please delete "mPa·s" and insert therefor -- mPa.s --.

Column 20,
Line 4, "mpa·s" and insert therefor -- mPa.s --.
Table VII, line 12 please delete "mPa · s" and insert therefor -- mPa.s --.
Table VII, 16, please delete (k · $h^{-1}$ · $m^{-2}$ · $bar^{-1}$)", and insert therefor -- (kg.$h^{-1}$ .$m^{-2}$.$bar^{-1}$) --.
Line 61, please delete "Pa·s" (first occurrence), and insert therefor -- Pa.S --.
Line 61, please delete "Pa·s" (second occurrence), and insert therefor -- Pa.S --.

Signed and Sealed this

Twenty-fourth Day of September, 2002

*Attest:*

*Attesting Officer*

JAMES E. ROGAN
*Director of the United States Patent and Trademark Office*